(Model.)
2 Sheets—Sheet 1.
A. DUVALL.
FISH TRAP.
No. 247,179.
Patented Sept. 20, 1881.
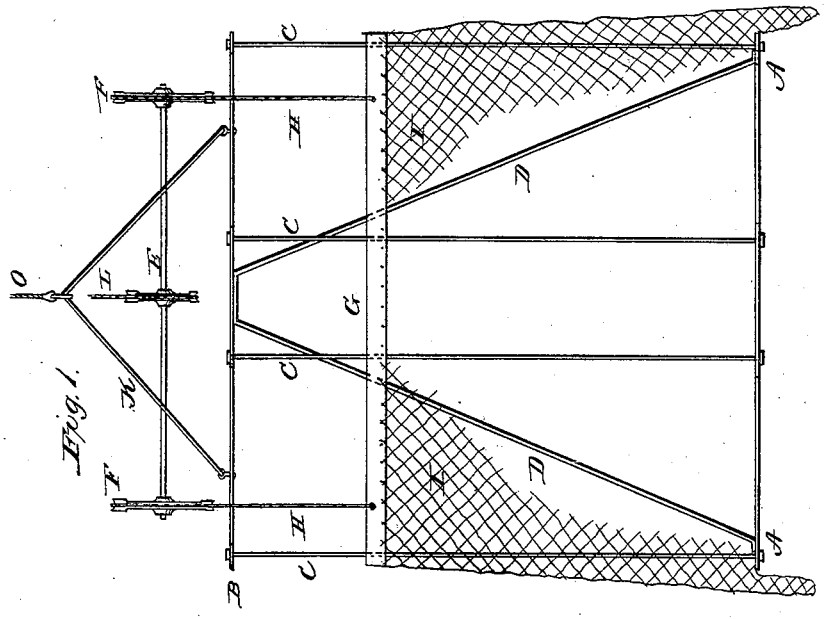
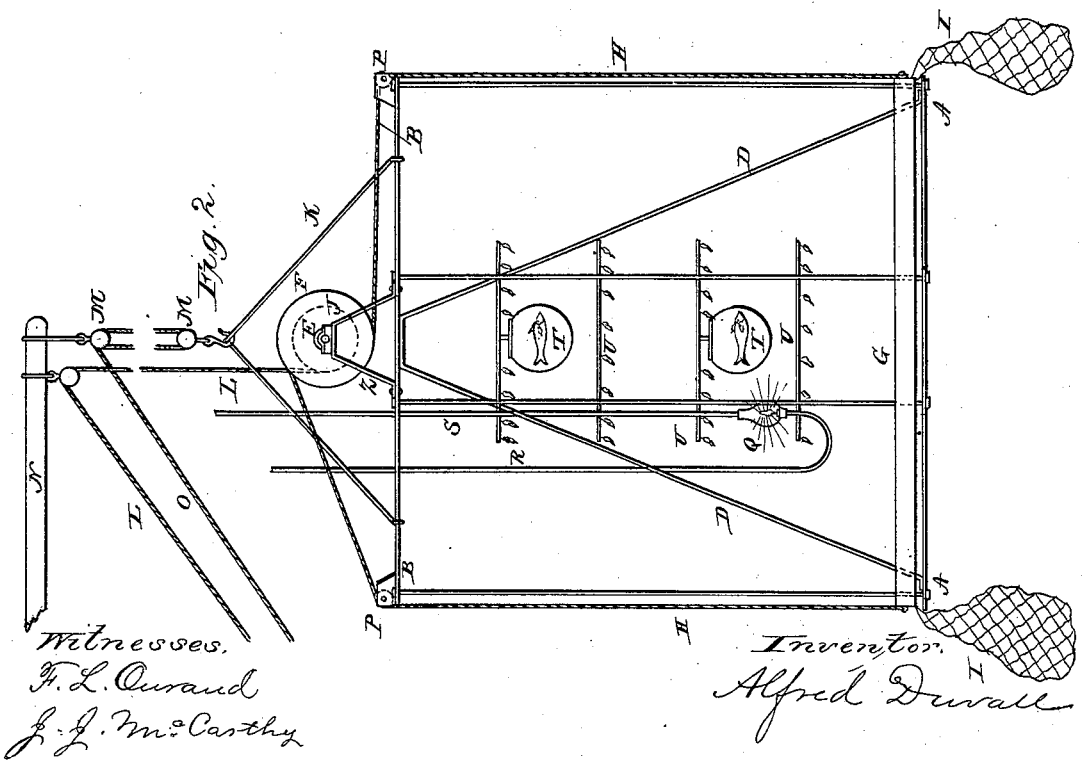
Witnesses.
F. L. Ourand
J. J. McCarthy
Inventor.
Alfred Duvall (Model.) 2 Sheets—Sheet 2.

A. DUVALL.
FISH TRAP.

No. 247,179. Patented Sept. 20, 1881.

Witnesses,
P. L. Ourand
J. J. McCarthy

Inventor,
Alfred Duvall

UNITED STATES PATENT OFFICE.

ALFRED DUVALL, OF BALTIMORE, MARYLAND.

FISH-TRAP.

SPECIFICATION forming part of Letters Patent No. 247,179, dated September 20, 1881.

Application filed May 9, 1881. (Model.)

*To all whom it may concern:*

Be it known that I, ALFRED DUVALL, of the county and city of Baltimore, State of Maryland, have invented a new Method and Appliance for Catching Fish, as described in the following specification, and shown by accompanying drawings.

Figure 3:
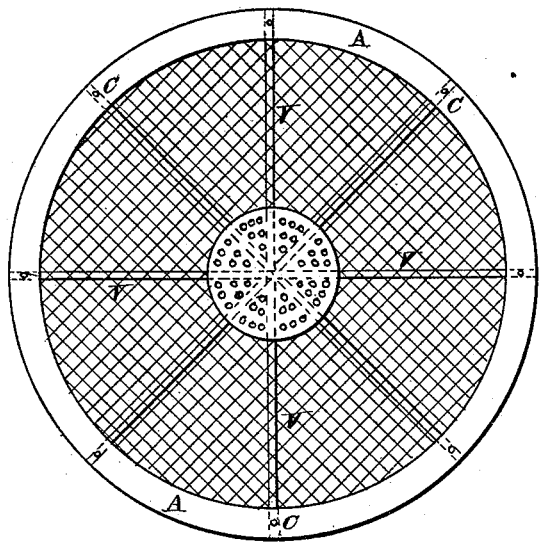
Figure 4:
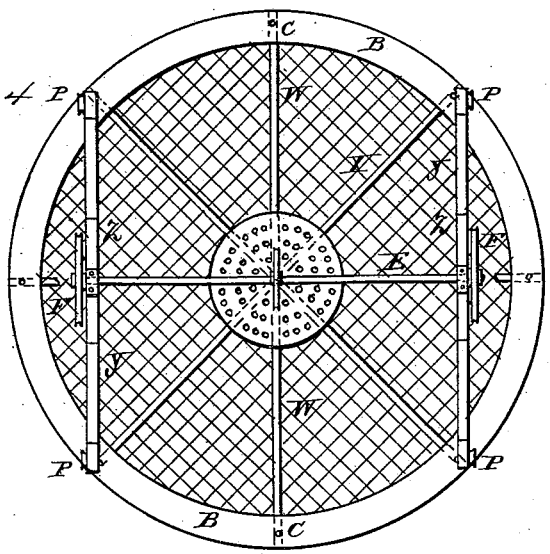

In the accompanying drawings, Figure 1, Plate 1, is an elevation and partial section through a center line of a fish-catching box or appliance, showing the movable seine or net surrounding the fishing-box partially drawn up. Fig. 2, Plate 1, is an elevation and partial section through a center line at right angles to Fig. 1; Fig. 3, Plate 2, plan of bottom; Fig. 4, Plate 2, plan of top.

The same letters of reference refer to identical parts.

A, Fig. 1, bottom of fishing-box, made of a ring of thin plate-iron properly stayed transversely with light iron bars, the opening being covered by cross-wires or wire-netting; B, top plate or cover of fishing-box, made similar to the bottom A; C, uprights of small wrought-iron pipe, fitted at each end with small screw-bolts, by which they are fastened to the plates A and B, thus forming the frame-work of the fishing-box, having eight bars in the outer circle and four in the inner, as shown by the Figs. 3 and 4, Plate 2; D, light braces, of which there are four; E, shaft of wrought-iron pipe, on which pulleys are fastened for quickly raising the seine or net surrounding the fishing-box; F, net-lifting pulleys on the shaft E; G, ring or hoop of iron surrounding the frame-work of the fishing-box, and to which the movable seine or net I is fastened at top, being fastened at bottom to the bottom plate of the fishing-box around its outer circumference; H, small cords fastened to the pulleys F and to the ring or hoop G, surrounding frame-work of the fishing-box at four equal distances; I, movable net, shown partly drawn up; J, hoisting-pulley on shaft E; K, connecting rods or chains, to which the tackle for raising and lowering the apparatus is attached; L, Fig. 2, Plate 1, hoisting-cord that is fastened to and around the pulley J on the shaft E, by means of which the pulleys F on the shaft E are made to revolve, drawing up or letting down the hoop or ring G, quickly, to which the net I is fastened; M, block and fall connecting with K, and attached to a crane, beam, or yard, N, and by means of which fall and rope O, connected with a windlass or otherwise, the fishing-box is lowered into the water to the depth desired, and when required hoisted from the water and swung on shipboard or on a pier or river-bank, as per circumstances; P, pulleys or sheaves, over which the cords H work; Q, lamp with white or colored glass globe, as practice may prove to be best; R, influent pipe to Q to give the necessary supply of air for supporting combustion in the lamp Q; S, effluent or escape pipe from Q.

It is intended to have one, two, or more lights to each appliance, as per circumstances or as practice may prove to be best.

The lamps can be supplied with necessary air for the support of combustion in them, as per the plan shown in Fig. 2, or a supply of air can be given to the lamp or lamps under water from a cylinder of compressed air, or the light may be given by electricity from a battery or otherwise; but an ordinary lamp burning oil will, no doubt, serve the purpose designed, and be the most simple and economical plan.

T represents glass globes, with small fish inclosed in them as an attraction for fish; U, small rods of iron pipe fastened to the inner upright bars, C, and braces D, and to which rods is to be fastened such class of bait as is most attractive to fish; V, Fig. 3, Plate 2, transverse stays of light flat iron for connecting and securely fastening together the inner and outer part of the bottom plates, A, and to which the iron-wire covering is attached; W, Fig. 4, Plate 2, stay-bars of light T or angle iron; X, stay-bars of light flat iron, fastening the inner and outer parts of the plate B together, and to which the wire covering of B is attached; Y, thin bars of flat iron fastened to the plate B and cross-stays, and on which the journal-boxes of the sheaves P are fastened at their respective ends; Z, bars of thin flat iron fastened to the transverse bars, and on which bars Z the frame-work of light wrought-iron for supporting the journal-bearings of the shaft E rests and is fastened.

The bottom, top, and frame-work of an appliance for catching fish as has been described in the preceding specification may be made of wood or wood and textile cords, or of wood and metal combined, and may be polygonal, circular, elliptical, square, or rectangular in form, and when made of wood alone or of wood and textile cords it will be sufficiently weighted to sink it.

Operation: An appliance for catching fish, as has been described in the foregoing specification, having the ring G and net I lowered on the outer part of A, and being baited, as desired, and with the lamp or lamps lighted, is swung off by a crane or yard from a vessel, pier, or shore as the case may be, and by means of the tackle arrangement lowered into the water to the depth desired. When, from indications or otherwise, it is supposed that there are a sufficient number of fish within the fishing-box the cord L is quickly drawn, thereby raising the surrounding ring and net, and inclosing such fish as may be within the fishing-box. Then by the tackle M O, attached to a windlass or otherwise, the fishing-box is raised out of the water and swung on deck or shore, and the ring G and net I lowered. The fish caught are then removed and the appliance again lowered for another draft of fish, and the operation thus carried on indefinitely. As the bait is consumed it may be renewed as desired, and the lamps refilled with oil when necessary.

From the foregoing description, with drawings, it is believed that any one will fully comprehend the simplicity and utility of my method and appliance for catching fish.

Having thus fully described my invention, what I claim as new, and desire to secure by Letters Patent, is—

1. A fish-trap composed of metallic top and bottom connected by rods and a vertically-sliding hoop outside the rods, having the upper portion of a net attached to it, the lower part of the net being connected to said bottom.

2. A fish-trap composed of metallic top and bottom connected by rods, and a vertically-sliding hoop outside the rods having the upper portion of a net attached to it, the lower part of the net being connected to said bottom, said trap being provided with means for holding bait, glass globes containing fish, and a lamp provided with pipes for the ingress and egress of air.

3. In a fish-trap, the combination of the top B, bottom A, and rods C with sliding hoop G, net I, attached to the hoop and to the bottom A, and means for raising the net, substantially as set forth.

4. In a fish-trap, the combination of the top B, bottom A, rods C, hoop G, net I, ropes H L, and pulleys P E F, substantially as described.

ALFRED DUVALL.

Witnesses:
A. LESLIE DUVALL,
JOHN NICK WATKINS.